US010522050B2

(12) United States Patent
Jones et al.

(10) Patent No.: US 10,522,050 B2
(45) Date of Patent: *Dec. 31, 2019

(54) TEST PALLET ASSEMBLY

(71) Applicant: NATIONAL ASSOC. OF BOARDS OF PHARMACY, Mount Prospect, IL (US)

(72) Inventors: Paul Edward Jones, Spanish Fork, UT (US); Joy Lynn Matthews-López, Athens, OH (US)

(73) Assignee: National Assoc. of Boards of Pharmacy, Mount Prospect, IL (US)

( * ) Notice: Subject to any disclaimer, the term of this patent is extended or adjusted under 35 U.S.C. 154(b) by 549 days.

This patent is subject to a terminal disclaimer.

(21) Appl. No.: 13/774,608

(22) Filed: Feb. 22, 2013

(65) Prior Publication Data
US 2013/0224702 A1 Aug. 29, 2013

Related U.S. Application Data

(60) Provisional application No. 61/683,461, filed on Aug. 15, 2012, provisional application No. 61/602,752, filed on Feb. 24, 2012, provisional application No. 61/602,882, filed on Feb. 24, 2012.

(51) Int. Cl.
*G09B 19/00* (2006.01)
*G09B 7/00* (2006.01)

(52) U.S. Cl.
CPC .............. *G09B 19/00* (2013.01); *G09B 7/00* (2013.01)

(58) Field of Classification Search
CPC .................................... G09B 7/02; G09B 7/04
USPC ......................................................... 434/236
See application file for complete search history.

(56) References Cited

U.S. PATENT DOCUMENTS

| | | | |
|---|---|---|---|
| 5,059,127 A | 10/1991 | Lewis et al. | |
| 5,204,813 A | 4/1993 | Samph | |
| 5,565,316 A | 10/1996 | Kershaw | |
| 5,657,256 A * | 8/1997 | Swanson et al. | 702/119 |
| 5,893,717 A | 4/1999 | Kirsch | |
| 6,000,945 A * | 12/1999 | Sanchez-Lazer | G09B 7/02 434/118 |
| 6,652,283 B1 * | 11/2003 | Van Schaack | G09B 5/00 434/236 |
| 6,704,741 B1 * | 3/2004 | Lively et al. | |
| 6,960,088 B1 | 11/2005 | Long | |

(Continued)

OTHER PUBLICATIONS

International Preliminary Report on Patentability for corresponding International Application No. PCT/US2013/027440, dated Sep. 4, 2014.

(Continued)

*Primary Examiner* — Xuan M Thai
*Assistant Examiner* — Sadaruz Zaman
(74) *Attorney, Agent, or Firm* — Faegre Baker Daniels LLP

(57) ABSTRACT

An optimization engine builds a set of test forms, called a pallet for use in a qualification test setting. The pallet is generated using a optimization engine programmed with constraints and goals for each test form in the pallet and for the pallet in general. A test information floor is set at the cut point of the test which causes test items to be focused at the area of the test where the pass/fail decision is made. Further constraints may be programmed to maximize the item diversity, that is, to spread the use of available test items as uniformly as possible.

22 Claims, 8 Drawing Sheets

Test Generation

(56) References Cited

U.S. PATENT DOCUMENTS

| | | | |
|---|---|---|---|
| 7,165,012 B2* | 1/2007 | Swanson | G06F 11/3684 424/118 |
| 7,828,551 B2* | 11/2010 | Bowers | G06F 11/3684 434/118 |
| 8,202,097 B1* | 6/2012 | Brittingham et al. | 434/322 |
| 8,348,674 B2 | 1/2013 | Henson | |
| 8,834,173 B2 | 9/2014 | McKinley | |
| 2003/0134261 A1 | 7/2003 | Jennen et al. | |
| 2003/0138765 A1 | 7/2003 | Bowers | |
| 2004/0059736 A1 | 3/2004 | Willse et al. | |
| 2004/0229199 A1 | 11/2004 | Ashley et al. | |
| 2004/0259062 A1 | 12/2004 | Heller | |
| 2005/0125196 A1* | 6/2005 | Swanson | G06F 11/3684 702/182 |
| 2005/0186551 A1 | 8/2005 | Belov | |
| 2005/0221265 A1 | 10/2005 | Tashiro | |
| 2005/0222799 A1 | 10/2005 | Bolt et al. | |
| 2005/0227215 A1 | 10/2005 | Bruno | |
| 2006/0035207 A1 | 2/2006 | Henson | |
| 2006/0115802 A1 | 6/2006 | Reynolds | |
| 2007/0048723 A1 | 3/2007 | Brewer et al. | |
| 2008/0187898 A1* | 8/2008 | Hattie | G09B 7/00 434/350 |
| 2009/0130644 A1 | 5/2009 | Lee | |
| 2009/0162827 A1 | 6/2009 | Benson et al. | |
| 2009/0202969 A1 | 8/2009 | Beauchamp et al. | |
| 2009/0233262 A1 | 9/2009 | Swanson | |
| 2010/0185957 A1 | 7/2010 | Van Ieperen et al. | |
| 2011/0045452 A1 | 2/2011 | Bejar et al. | |
| 2011/0244440 A1 | 10/2011 | Saxon et al. | |
| 2012/0052468 A1 | 3/2012 | Granpeesheh | |
| 2012/0178072 A1* | 7/2012 | Adam | G09B 5/00 434/350 |
| 2012/0308968 A1* | 12/2012 | Leinonen | G09B 19/06 434/156 |
| 2013/0226519 A1 | 8/2013 | Jones | |
| 2015/0031010 A1 | 1/2015 | Kullok | |
| 2015/0072332 A1 | 3/2015 | Lin | |
| 2016/0180733 A1 | 6/2016 | Foley, Jr. | |

OTHER PUBLICATIONS

International Preliminary Report on Patentability for corresponding International Application No. PCT/US2013/027320, dated Sep. 4, 2014.

International Preliminary Report on Patentability for corresponding International Application No. PCT/US2013/027322, dated Sep. 4, 2014.

International Search Report and Written Opinion for Application No. PCT/US2013/027320 dated Apr. 19, 2013.

International Search Report and Written Opinion for App. No. PCT/US13/027322 dated Apr. 29, 2013.

International Search Report and Written Opinion for App. No. PCT/US13/27440 dated May 3, 2013.

Website: "Facets Many-Facet Rasch Measurement," retrieved from http://www.winsteps.com, Jun. 20, 2009, 2 pages.

Website: "Winsteps Rasch Measurement Software," retrieved from http://www.winsteps.com, Jun. 20, 2009, 2 pages.

U.S. Patent and Trademark Office; U.S. Appl. No. 13/774,771; Non-Final Rejection; dated Dec. 10, 2014.

U.S. Patent and Trademark Office; U.S. Appl. No. 13/774,771; Final Rejection; dated Oct. 6, 2015.

U.S. Patent and Trademark Office; U.S. Appl. No. 13/774,771; Non-Final Rejection; dated Jun. 6, 2016.

U.S. Patent and Trademark Office; U.S. Appl. No. 13/774,771; Final Rejection; dated Jan. 11, 2017.

U.S. Patent and Trademark Office; U.S. Appl. No. 13/587,022; Non-Final Rejection; dated Jun. 2, 2015.

U.S. Patent and Trademark Office; U.S. Appl. No. 13/587,022; Final Rejection; dated Dec. 9, 2015.

* cited by examiner

Test Generation

TEST PALLET ASSEMBLY

CROSS-REFERENCE TO RELATED APPLICATIONS

This patent claims priority to U.S. Provisional Application No. 61/602,752 filed Feb. 24, 2012, entitled "Test Pallet Assembly," U.S. Provisional Patent Application No. 61/602,882, filed Feb. 24, 2012, entitled "Outlier Detection Tool," and U.S. Provisional Patent Application No. 61/683,461, filed Aug. 15, 2012, entitled, "Test Pallet Assembly and Family Assignment," all which are hereby incorporated by reference for all purposes.

TECHNICAL FIELD

This patent is directed to test generation and more specifically to an automatically generated set of test forms meeting defined psychometric requirements.

BACKGROUND

Testing to determine competence in a particular field has long been of interest. Testing is used in virtually all areas of commercial enterprise and government to evaluate candidates seeking certification in certain professional capacities, including real estate brokers, attorneys, medical doctors, etc. As opposed to student/classroom testing, where the goal is to give the test taker an absolute score on a continuum, often the goal of tests used for licensing is to place a candidate above or below a cut point or pass/fail level of latent ability.

Licensure tests attempt to maintain consistency over a period of time, while reflecting changes in laws, rules, or advances in the field that affect its particular subject matter. Additionally, the use of such standardized tests, potentially over a period of time, creates security risks associated with multiple administrations of the test. These risks include hacking test host computer systems, test item harvesting and subsequent answer distribution, etc. To address some of these issues, multiple versions of tests may be generated for a given round of testing where each test instance, or form, is assembled from a pool of test items.

Linear on-the-fly ("LOFT") or computer adaptive tests ("CAT") have become popular alternatives for optimizing educational and psychological measurement for specific purposes while minimizing certain risks, such as test item harvesting. Linear on-the-fly exams construct test forms out of a pool of items or item sets either just prior to or while the test taker responds to the test items. LOFT forms are usually constructed to optimized measurement precision in certain regions of the score scale for all test takers, as in the case of certification or licensure exams where precision is maximized near the pass/fail or "cut" point. Adaptive tests present test items selected from a pool of test items by using responses to previous test items to estimate the test taker's latent ability. Adaptive tests seek to either minimize test time or maximize score precision for each individual test taker by selecting items that are most appropriate for the individual based on his or her apparent competence. In addition to maximizing measurement, both of these methods seek to present unique exam forms to each individual, thus minimizing the opportunity for one individual to share items with another. However, both of these methods have well-known liabilities. Neither method offers the opportunity for pre-delivery review of the test as presented by subject matter experts because the test is assembled during the actual test session. Without the benefit of specific review, the LOFT or CAT forms may be subject to previously unidentified interactions, such as test item enemies. Further while most LOFT and CAT algorithms seek to minimize departures from targeted psychometric and content constraints for the forms they assemble, they often cannot guarantee constraint compliance for individual test takers. In the case of both LOFT and CAT the aggregate psychometric and content properties of all the forms produced cannot be known ahead of time, only simulated. Existing LOFT and CAT algorithms do not track aggregate item exposure in real time for items in their pools and usually cannot guarantee that certain items will not be over-exposed or under-utilized. Current LOFT and CAT forms are assembled individually and in isolation and may underuse or overexpose portions of the item pool. Finally, both LOFT and CAT testing can sometimes require a significant amount of processing power at a testing facility that increases the cost and overhead of administering the test and may limit the number of facilities capable of delivering a specific test.

SUMMARY

The use of linear programming or similar techniques in an optimization engine for solving multiply constrained problems can be used to generate test forms for use in testing applications. Test forms are comprised of test items. Test items can either be operational (contribute towards a candidate's score) or pretest (do not contribute towards a candidate's score). A specifically engineered set of test forms, referred to here as a "pallet of test forms" or simply, a "pallet", draws on a pool of test items with identified characteristics as an input to the optimization engine. These characteristics may include one or more subject matter areas to which the test item refers, the difficulty, discrimination, and pseudo-guessing properties of the test item, whether a use of a particular test item affects use of other test items, as well as other content or cognitive attributes. These characteristics are typically captured as metadata associated with each test item.

The development of the pallet has both goals, such as the maximization of measurement precision near the cut score, and constraints, such as a number of test forms to be generated for a particular pallet, a number of test items in each form, a length of the test, etc. One constraint of particular interest is the use, or exposure, of individual test items. Overuse of a test item can, among other things, make it easier to harvest and divulge the test item to future test takers. Underuse of some test items goes hand-in-hand with overuse of others and represents a waste of costly intellectual assets since each operational test item costs many hundreds of dollars to develop, refine, evaluate, and publish. Therefore, an important goal for pallet preparation can be to minimize exposure of individual items by maximizing the uniformity of item exposures across the source item pool while simultaneously complying with all content constraints for the form and pallet. One way to do this is to minimize the number of aggregate exposures in the items selected for each form. Alternatively, in the case where each item has a maximum number of availabilities allotted, one may maximize the aggregate availabilities of the selected items. In either case, the goal in assembling the pallet is to maximize test item diversity among test forms.

Another area of particular interest in pallet assembly is the score precision of an exam across the ability continuum. Under item response theory the sensitivity of a set of items to differences in ability at each point along the continuum is captured by a quantity know as "measurement information", "test information", or simply "information". The greater the information value for a test form in a particular score region, the more precise the scores occurring in that region will be. There is an obvious need to assure that each test form meets specific precision criteria in specific regions of the ability continuum. For a certification or licensure exam the region of greatest interest is that surrounding the cut score. As discussed in more detail below, assuring a minimum level of measurement information or "information floor" near the cut is at odds with the desire to uniformly spread item exposures across the pool.

When the objectives and constraints for a pallet are identified, as well as a pool of test items from which to draw, a program for an optimization engine may be written to capture the objectives and constraints for each form, including those outlined above. Executing the program on the optimization engine generates a pallet of tests meeting the programmed assembly objectives and constraints including having a set information floor at the cut point of a form while maximizing item use. The pallet so generated also has a specified number of forms, promotes content validity by ensuring precise compliance with all content specifications, promotes fairness by minimizing variability in test information near the cut point, and allows post-generation expert review of forms.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '[term]' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
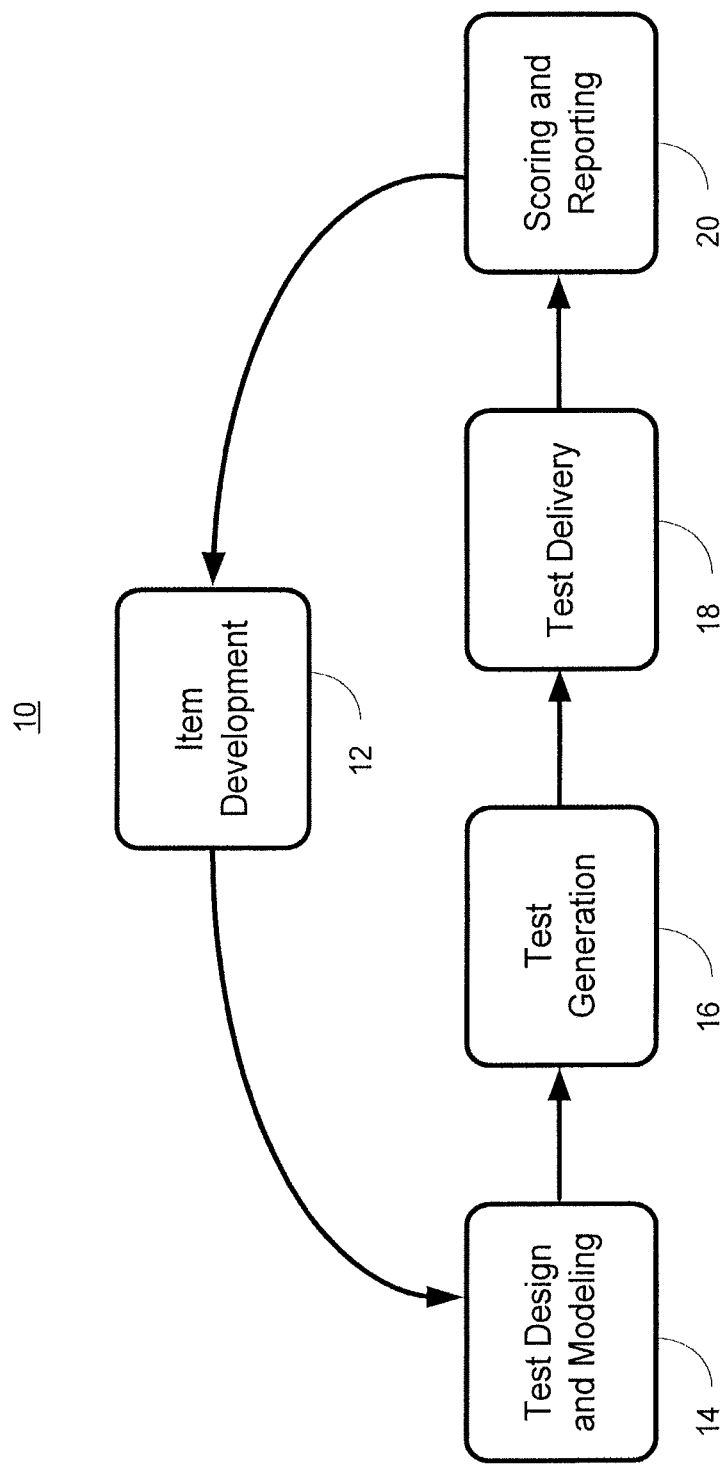
FIG. 1 illustrates a representative testing cycle.

FIG. 1 illustrates a representative testing cycle 10. The testing cycle 10 involves development of test items (block 12), that is, individual questions or other items requiring a response from a test subject. Using the test items, a test may be designed to meet certain requirements of the test client (block 14). As discussed above, some tests may be targeted at ascertaining a test subject's ability level against a certain metric, such as grade level in reading. Other tests may be targeted at estimating a test subject's latent ability at a given pass/fail test cut point. Tests are usually generated according specific objectives while complying with constraints articulated in the test specification and embodied in a particular assembly model (block 14). Some tests may be presented in a fixed order, such as in a paper test, or test items may be presented to a test subject in an order determined during the administration of the test, as in an adaptive or linear on-the-fly test. After the test is administered (block 18), an analysis and scoring process is performed to evaluate the operational and pretest items, calibrate items moving from pretest to operational status, identify and take action on any anomalies found in the test administration, and generate, evaluate and report scores to test consumers (block 20). The exemplary embodiments described here are, for the sake of simplicity but without limitation, directed to pass/fail testing, such as a board test for professional licensing.

Figure 2:
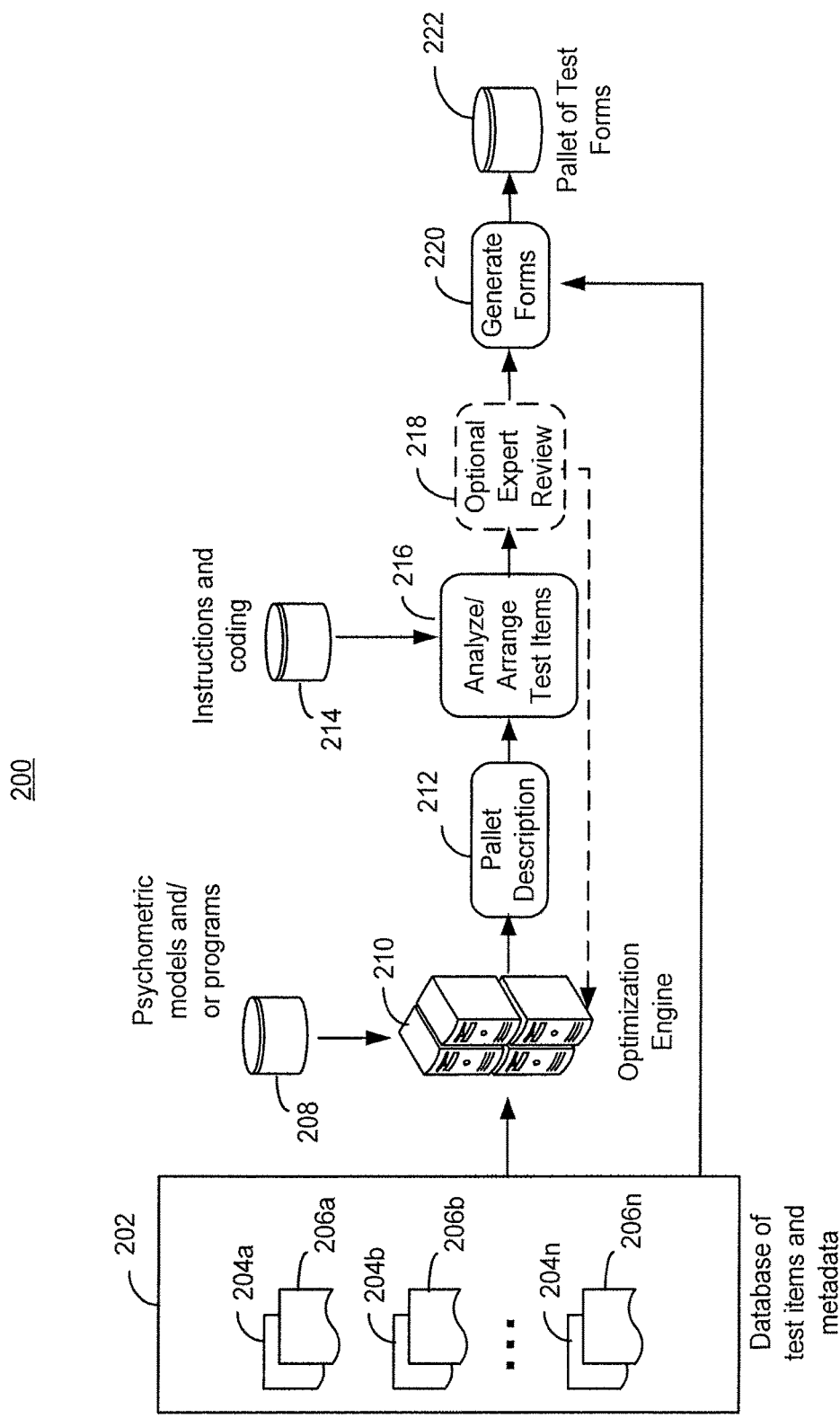
FIG. 2 is a block diagram illustrating a pallet test generation process.

FIG. 2 is a block diagram 200 illustrating a pallet test generation process, generally covering elements of blocks 14 and 16 of FIG. 1. A database 202 stores test items 204a-204n and associated metadata 206a-206n. While an individual test item 204 may be associated with more than a category of a test, for example, a state qualifying examination and also a college-level aptitude test, generally each test item is directed to a single purpose, such as veterinarian licensing, pharmacist licensing, etc. There is generally a one-to-one correspondence between a test item 204a and its associated metadata 206a. While this one-to-one relationship is not essential, it is desirable for some embodiments of test assembly, as described below.

Psychometric models may be stored in either a second database or, as depicted in FIG. 2, a data store 208. A psychometric model may be a collection of constraints used to bound the nature of a particular pallet. The psychometric model may carry over to other tests covering the same qualification, such as a particular license. In this manner, tests given over a number of years may be kept relatively consistent while accommodating the changing needs of the subject area to which the testing applies.

For example, a pharmacology licensing test may include some of the following constraints or goals directed at both individual forms and the overall pallet, although the list is representative and is not intended to be comprehensive:

To the extent each test item is in a category, such as legal requirements, drug interactions, pediatric considerations, etc., the minimum and maximum number of items for each category.

A target test information floor at the test cut point. As discussed in more detail with respect to FIG. 5, each test item is associated with an item information function, that is, the measure of the sensitivity of that item to changes in latent test-taker ability as a function of latent ability. The item information function is generally bell-shaped, but its shape, height and position along the latent ability scale are idiosyncratic to each item. The sum of the item information functions in a particular test form is known as the test information function. Of particular interest for a credentialing exam is the test information value at the cut point. In constructing a credentialing exam it is desirable to select items so that a minimum test information value, or information floor, is obtained at the cut point.

Zero or more references to a particular medication, and conversely a maximum number of items directed to any one particular medication.

A minimum and maximum number of pediatric questions per form. Similarly, requirements may be included for a min/max range of items covering disease states, requirements for clinical data, symptoms, etc.

Identification of related items as a set or testlet, where the number and size of testlets is between a minimum and maximum number of items presented Test item metadata, testlet information, or both, may specify the exact test items in the set and an appearance sequence, if any, for a particular testlet. Alternatively, testlet information may simply specify that for any testlet sampled, the number of cohort items to appear on a single form from that testlet must fall between a minimum and maximum value.

A directive to maximize item diversity across the pallet, as discussed more below.

A maximum allowable exposure rate for any one item across a pallet. However, the above directive to maximize exposure will attempt to use test items equally, so the maximum exposure rate is more or less a backstop on form generation across a pallet.

A total of items belonging to testlets vs. a number of free standing items.

A number of questions per form and/or a targeted test time per form, where each test item metadata specifies an average response time.

Enemy item pairs, that is, pairs of test items such that if one member of the pair is used on a test form the second item should be excluded from the form because it may divulge or allude to the answer to the first item or may be too redundant in intent.

A number of pretest and/or operational items. Each test item has a "state" metadatum that specifies whether the item will be scored (operational) or left unscored (pretest). Pretest items are included for evaluation and possible use in future tests. Pretest items do not have psychometric parameters by definition, since they are only in the process of being evaluated and do not contribute to scoring. However they have all the other features of operational items and must be assembled independently of but in coordination with the assembly of operational items according to their own specifications per test form.

A number of test items may be designated as preferred items, for example, test items having value over a long period. Such items may have particular exposure goals so that they are not overused and become common knowledge to the community.

The data store 208 may also include a number of forms to be generated for a particular pallet. The data store 208 or a similar computer-readable memory may also include test generation parameters used during the pallet generation process for tracking item usage, testlet usage, etc.

The data store 208 may also store a computer-executable program that is used to codify the above and any other constraints and goals for the pallet. An optimization engine 210 may be used to execute the program. Execution of the program on the optimization engine 210 generates a pallet description 212 representing the final forms in the pallet. The optimization engine may be any of several known optimization engines, for example, linear programming solution engines used to optimize a solution over a given set of constraints. Such programs are used in a number of fields from product marketing to airline scheduling. One exemplary program is the IBM® ILOG® CPLEX® optimizer that uses a programming language known as OPL. Other equivalent products are known in the industry, such as the Analytica Optimizer from Lumina Decision Systems.

In an embodiment, an OPL program incorporating the relevant constraints may be developed by a psychometrician or other programmer and executed on the optimization engine 210. Using test item metadata 206a-206n, the optimization engine 210 generates the pallet description 212, including a list of test items for each form.

During the generation of the forms for the pallet, test generation parameters may be set to initial values prior to execution and then updated at the end of each form generation cycle. In an embodiment, each test item may be assigned an eligibility weighting that is used for distribution of test items across a form. After an item is selected, its eligibility weighting may be reduced and subsequently increased after generation of a form in which the item is not selected. However, other mechanisms for item distribution may be used, based on the optimization engine and the programmer. For example, usage vs. a maximum availability count may be another way of controlling item exposure, where each item's availability parameter may be reduced by one if that item is used on a particular form.

Additionally, some items may be designated as preferred items. Preferred items may include high value test items that may be used over a long period, as well as others, such as those covering particularly narrow subject matter. To avoid the item becoming overused and reducing its long term value, preferred items may be separately metered for inclusion in forms. For example, after inclusion in a form, a probability for next use, such an eligibility weighting may be set to a low value and increased incrementally after each form in which the item is not used, thereby increasing its statistical odds of being selected. Alternatively, the program may set an exclusion parameter for the item that prevents use of the item in subsequent forms, up to a value of the setting, after which the item is again eligible for selection.

Instructions and coding information 214 may be stored in a computer memory and used to analyze and arrange the test items for each form. That is, specific test instructions for a proctor/test administrator and for the test subject may be added to the pallet and the individual test items may be arranged according to certain criteria, for example, sequencing items in a testlet.

An optional expert review 218 may be performed to review the content of each form, with the goal of identifying additional item enemies, test items requiring change due to recent changes in law or the corresponding practice being tested, under-coded test items resulting in test anomalies, etc. One advantage of the current technique is that if one or more test items are identified during expert review as requiring change or replacement, the optimization engine can redevelop changed forms without regenerating each form from scratch.

When expert review 218, if any, is complete and any changes are made to the pallet description 212, the actual pallet may be generated 220 with each of the forms assembled with test item text, images, charts, etc., being drawn from the database 202 and assembled into a pallet of test forms ready for delivery either via the web or a testing facility. The final assembly may include translating the test items and instructions into a format and/or protocol associated with a particular test delivery architecture, such as one associated with a given testing facility and its specialized test delivery requirements. The completed and assembled forms may be stored in a second data store 222.

Figure 3:
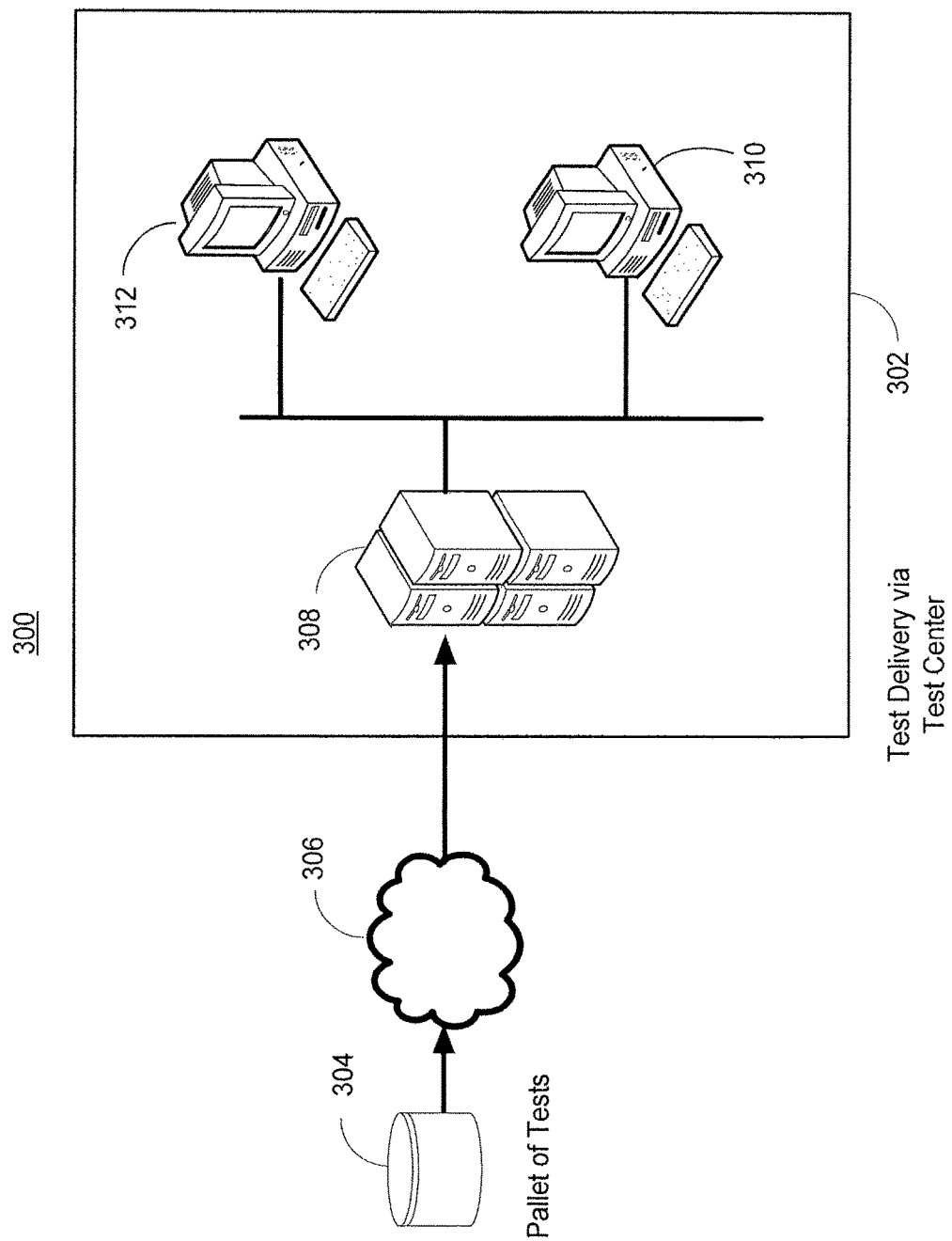
FIG. 3 is a block diagram of an exemplary test delivery system.

FIG. 3 illustrates a system 300 for delivery of a test via a test center 302. In such centers 302 the pallet of test forms 304 are delivered in a secure fashion either manually (not depicted) or via a network 306. The pallet 304 is stored in a server 308 and delivered to test subjects via test stations 310 and 312 in accordance with the instructions accompanying the pallet 304. Certain advantages of monitored tests include candidate identity verification and monitored test environments. However, transfer of the test to an outside facility incurs a small but real risk of a comprise of the test forms or results tampering.

Figure 4:
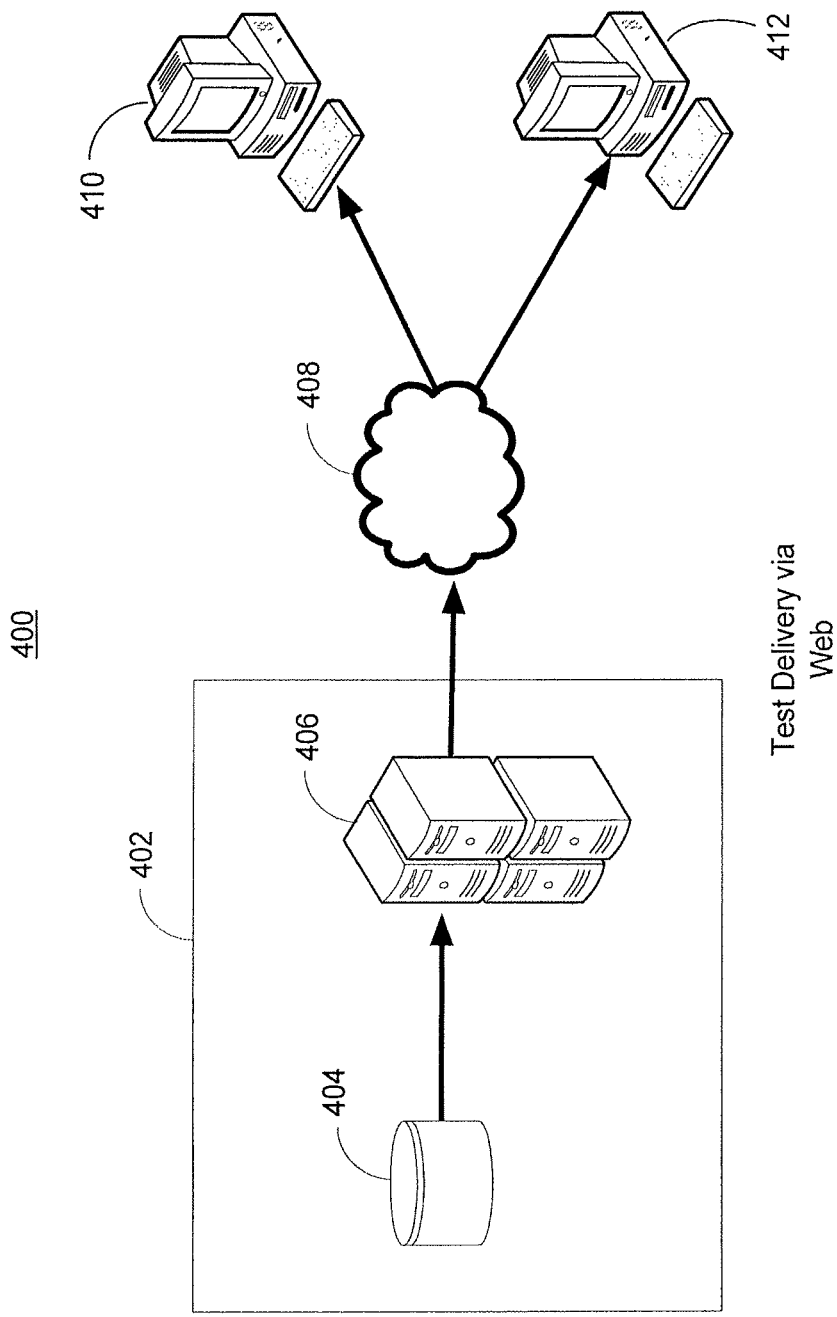
FIG. 4 is a block diagram of a second exemplary test delivery system.

FIG. 4 illustrates a system 400 for delivery of a test via a network 408, such as the Internet. The pallet of test forms 404 may be stored on a server 406 at the test generation facility 402 and delivered via test subject stations 410 and 412. In most cases, the stations 410 and 412 would still be located at a testing facility to help ensure candidate identity verification, etc. Delivering the test from the test generation facility 402 reduces the risk of compromised tests and results tampering.

Figure 5:
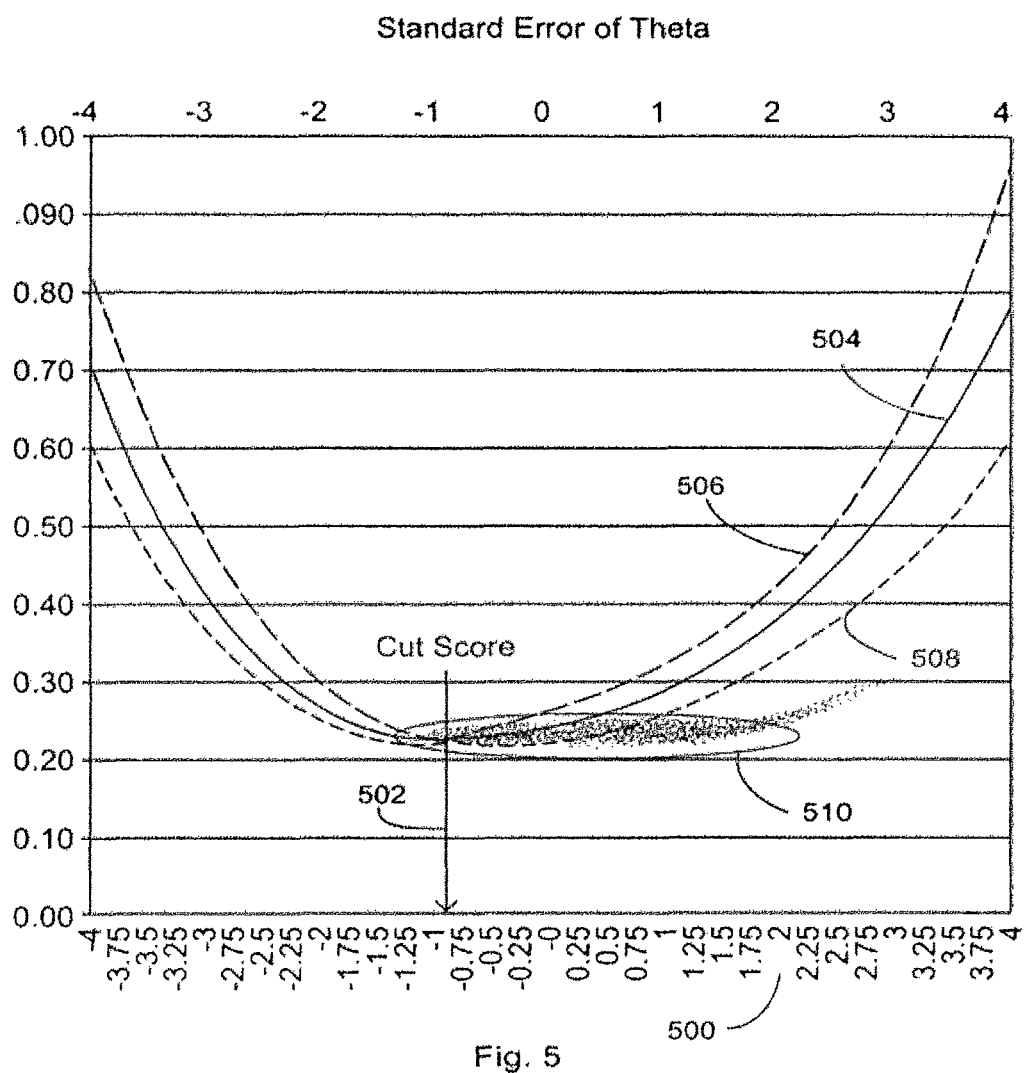
FIG. 5 is a graph showing sample target and actual test information distribution for a pallet.

FIG. 5 is a graph 500 of a standard error function using the current technique. "Standard error of theta" is measure of the precision of ability or "theta" estimates resulting from a test across the ability continuum, where ability increases from low to high across the horizontal access. As test information increases (not shown) the standard error of theta decreases, so the lowest values indicate the most accurate measurements. The labeled vertical 502 line shows the position of the cut score. The solid curve 504 represents the mean standard error function resulting from a pallet of forms assembled with the current technique, while the dotted curves represent maximum values 506 and minimum values 508. Superimposed over these curves is a cloud 510 representing the final standard errors of over 6000 CAT exams constructed from the same item pool. Because the goal of testing in the exemplary embodiment is to arrive at a pass/fail decision for a test subject, focusing test information (and minimizing the standard error) around the cut point allows a finer evaluation of test subjects near the pass/fail mark (cut point) rather than focusing on those who pass easily (right side) or fail miserably (left side).

Corresponding to FIG. 5, Table 1 shows a comparison of item exposure for a series of actual computer adaptive tests (CAT) vs. a pallet of tests generated in accordance with the current disclosure (Pallet Assembly). The table shows the percentage of forms on which a particular test item occurs (item exposure) and the frequency of such occurrence under CAT and Pallet Assembly. In practice, items with exposure greater than 0.30 are considered to be at risk for item harvesting.

TABLE 1

| Exposure | CAT | PA | |
|---|---|---|---|
| 1.00 | 0 | 0 | |
| 0.95 | 0 | 0 | |
| 0.90 | 0 | 0 | |
| 0.85 | 1 | 0 | |
| 0.80 | 4 | 0 | |
| 0.75 | 3 | 0 | |
| 0.70 | 4 | 0 | |
| 0.65 | 3 | 0 | |
| 0.60 | 3 | 0 | |
| 0.55 | 6 | 0 | |
| 0.50 | 11 | 0 | |
| 0.45 | 32 | 0 | |
| 0.40 | 19 | 0 | |
| 0.35 | 19 | 0 | |
| 0.30 | 50 | 0 | |
| 0.25 | 61 | 197 | ← Max usage = 0.221 |
| 0.20 | 113 | 166 | |
| 0.15 | 115 | 232 | |
| 0.10 | 48 | 85 | |
| 0.09 | 86 | 90 | |
| 0.08 | 118 | 97 | |
| 0.07 | 114 | 117 | |
| 0.06 | 117 | 62 | |
| 0.05 | 45 | 137 | |
| 0.04 | 43 | 129 | |
| 0.03 | 21 | 107 | |
| 0.02 | 161 | 77 | |
| 0.01 | 138 | 18 | |
| 0.00 | 183 | 4 | |
| Total | 1518 | 1518 | |

As can be seen, the pallet assembly-generated forms use more items overall compared to the prior art CAT test. Note that 183 items under CAT are completely ignored (delivered less than 1% of the time) versus only 4 such items under Pallet Assembly. Further, no test items appear on more than 22.1% of the forms under Pallet Assembly vs. 178 items that appear on more than 22.1% or test instances under CAT. In addition to optimal measurement at the cut point and good item utilization, pallet assembly has other positive impacts on test administration. Many CAT implementations allow small departures from the test content specifications in order to meet the psychometric demand of an accurate test for each individual. Pallet assembly using an optimization engine 210 helps ensure compliance with all content and psychometric constraints in the final pallet compared to other test delivery methods so that no candidate receives a form that is "out of spec". Under CAT, each test taker gets a test that is tailored to his or her ability, a condition that promotes score precision but may be disconcerting psychologically, given that all test takers get about half the presented items correct. Under pallet assembly each test taker gets a test that is substantially the same as every other test in terms of content, difficulty, and measurement precision at the cut point, a condition that promotes fairness and standardization. While every candidate does not get a unique test, when pallets of, say 180-200 forms are constructed and randomly assigned to several thousand test takers, the chances of any two test takers getting the same test are small. Even though small groups of test takers may be randomly assigned to the same form, the overall average pairwise item overlap between forms is substantially less than with many alternative test delivery methods, such as CAT.

Under CAT many items may be under-utilized, as discussed above. As shown in the Table 1 illustration, 503 out of 1518 pool items are used 3% of the time or less under CAT. Under Pallet Assembly, 181 test forms are constructed with only 206 items used 3% of the time or less. In contrast, by comparison the unused information under CAT peaks near the cut point where it is most valuable for pass-fail decision making, whereas the unused information under Pallet Assembly occurs at the extreme high end of the score distribution where information isn't as valuable.

Figure 6:
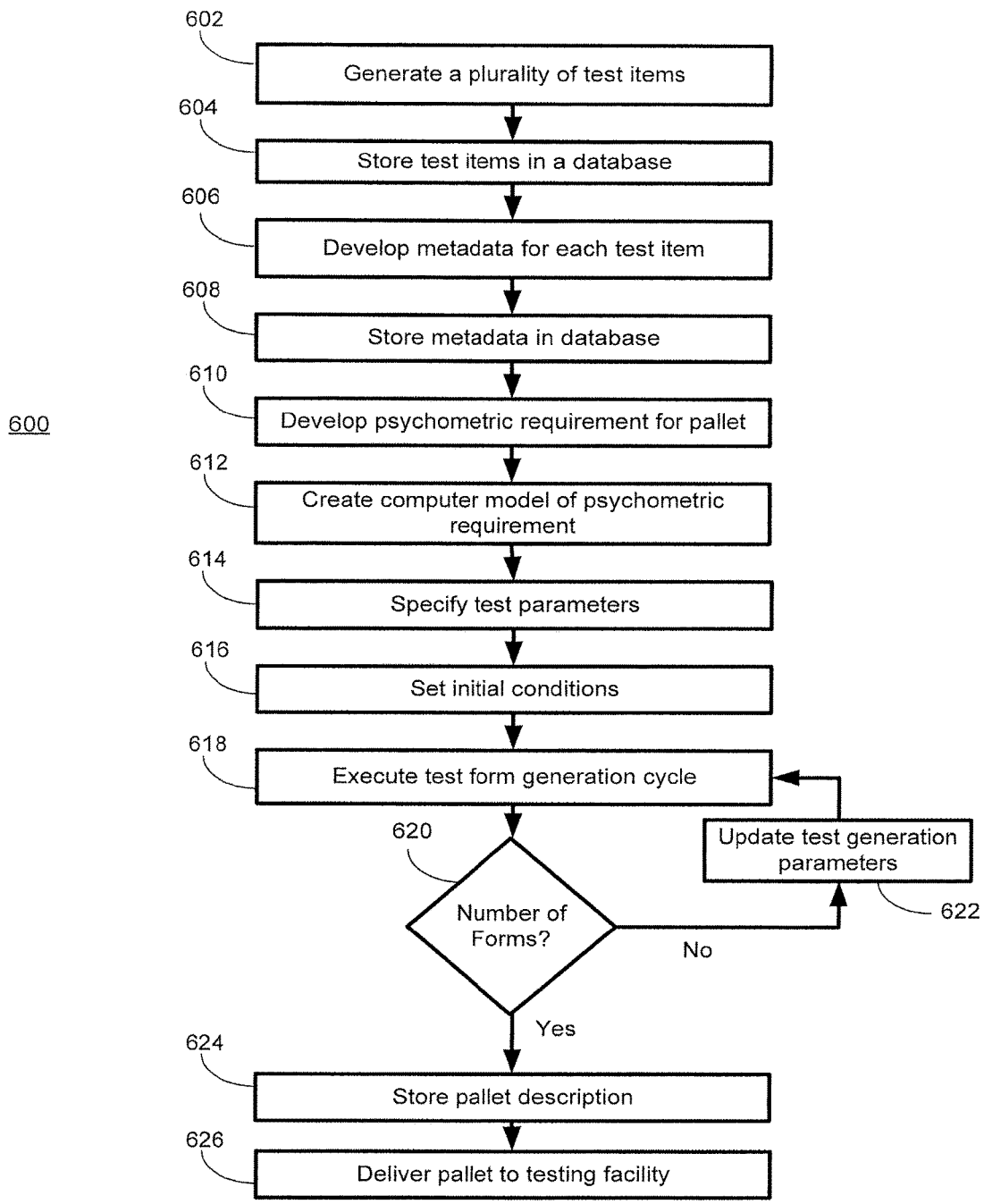
FIG. 6 is an exemplary method of generating a pallet of tests.

FIG. 6 illustrates a method 600 of assembling a set of test forms or a "pallet" where each test form in the pallet complies with given psychometric and content constraints. A plurality of test items may be generated, including collecting pre-test items and operational items from previous administration of tests (block 602). The test items may be stored in a database (block 604), such as database 202 of FIG. 2.

For each test item, metadata may be developed through an analysis of the test item response data (block 606). The metadata may describe psychometric characteristics of each test item, such as item difficulty, discrimination, and pseudo-guessing characteristics (quantities from which test information is derived). The metadata may include subject matter or cognitive classifications, tags for mentioned content such as specific drugs or medical conditions. The metadata may include item interaction information that describes, for example, whether the item is part of a testlet. Interaction data may also include enemy data describing two or more test items that should not appear in the same test form. The metadata may be stored (block 608) in the database, such as database 202.

Psychometric and content requirements for a particular pallet may be developed (block 610) that describe a "blueprint" for all test forms in the pallet, including minimum and maximum items to be delivered in different content categories and other constraints or goals as outlined above. In particular, developing the psychometric requirement may include setting a psychometric requirement maximizing item diversity across the pallet and setting a test information floor at the test cut point. That is, the optimization engine will attempt to maximize the spread of test item uses across the item pool while simultaneously meeting the information constraint at the cut point as well as all other content constraints.

In some implementations, a user interface at a computing device initiates the development of metadata for each test item. The user interface may be, for example, a web interface executed by one or more processors of a computing device. The user may select one or more test items stored in a database (block 604), such as database 202 of FIG. 2, via the user interface and initiate the development of metadata, for the selected test items, "on-the-fly." Further, the user interface may present visualizations of the generated metadata, such as tables and graphs, to the user and/or export the metadata in any appropriate format, such as a spreadsheet, for example.

After the psychometric requirements are defined, these requirements may be coded into a program to create a computer model of the psychometric requirements (block 612), for example, in the form of a program. In one embodiment the OPL programming language may be used.

Test parameters may be specified (block 614) for the pallet, including, but not limited to, a number of forms (individual test instances) to include in the pallet and test item generation parameters including item usage maximums, preferred item settings, etc.

The test generation parameters may be set to initial values (block 616) and a form may be generated and saved (block 618) using the optimization engine to execute the program in view of the test generation parameters. A test may be performed to determine if the required number of forms has been generated (block 620). If more forms are needed, the "no" branch may be followed and the test generation parameters may be updated (block 622). In some embodiments, each item used in a form will have its corresponding maximum usage parameter reduced by one. This may be used to statistically change the item's probability of being selected again so as to maximize item usage.

When the required number of forms has been generated, the "yes" branch may be followed and the pallet description may be saved, optionally including statistical data about the forms and the pallet as a whole (block 624). The completed pallet, including test administration information may be delivered to a testing facility (block 626) where individual tests from the pallet may be administered to individual test takers.

Figure 7:
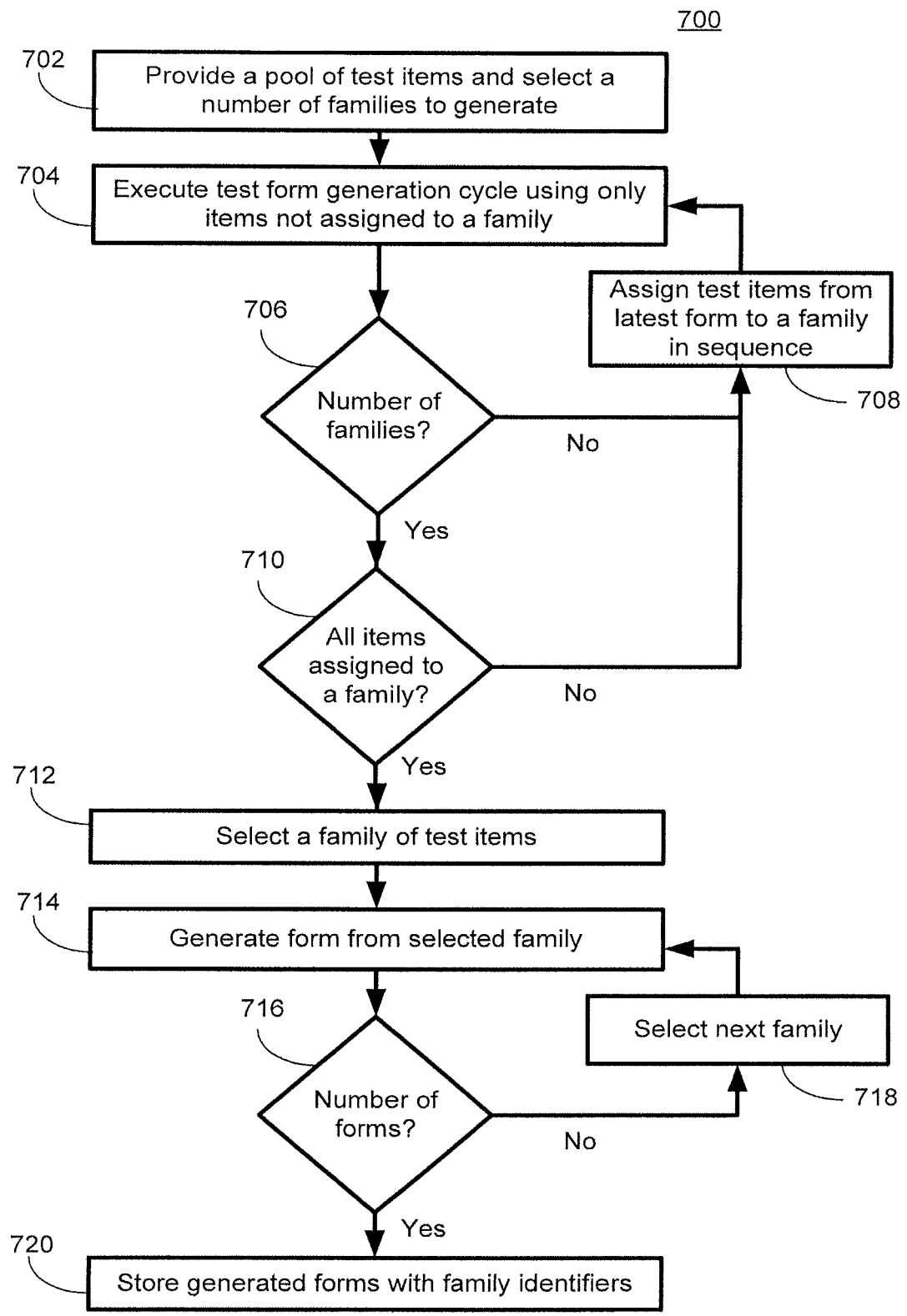
FIG. 7 is a supplement to the method illustrated in FIG. 6.

FIG. 7 continues the method of FIG. 6 and illustrates a supplementary method 700 that provides a protection against duplicate item exposure to repeat test-takers. In general, the method 700 divides test items into a set of families that are used to generate forms. Therefore, forms from different families will all meet the same psychometric and content requirements but will have no duplicated test items.

Test items are provided in a pool of test items and a number of families of items is selected by a test designer (block 702). For the sake of illustration, three families will be used, but any number of families can be generated by setting the number of families at this point. A first form is generated from the pool of test items (block 704). If the number of families has not been reached (block 706), items from the first form are assigned to a first family (block 708).

The test generation cycle is repeated using only items from the item pool that have not already been assigned to a family. In this first pass through the loop, all items except those in the first form, now assigned to the first family, are available. Because our illustrative case is using three families, the no branch is taken (block 706) and those items in the second form are assigned to a second family (block 708). At a third pass, those test items in the third form, selected from the items not already in the first or second families, are assigned to a third family (block 708).

When the next form is generated (block 704) and the number of families (three) has been reached, the yes branch is taken (block 706. If there are still unassigned items in the pool of test items (block 710) the no branch is taken. Items from the fourth form are assigned to the first family. Items for each subsequent pass will be assigned to the next family in the sequence until enough forms have been created to cause all the test items to be assigned to one of the three families (per the exemplary embodiment).

Assuming additional forms are to be generated, a family of test items is selected (block 712), for example, the first family, and a form is generated using only items from that family. Note that the application of psychometric and content requirements, as described above with respect to FIG. 6, for each form being generated are still adhered to. If more forms are to be generated, the next family in the sequence is selected (block 718) and the next form is generated (block 714). Each family may be selected in sequence so that an equal, or nearly equal, number of forms are generated from each family.

When the required number of forms has been generated, the yes branch from block 716 may be followed. Each form generated is stored with its respective family identifier (block 720). When administering tests, each test taker's information will include the family from which his or her test form was selected. Should that individual be required to re-take the test, a form from another family may be selected, ensuring that no duplicate test items will be given to the test taker. Thus, the repeat test taker does not benefit from item harvesting questions presented during his or her previous attempt.

Alternatively, the form generation process could be applied to the entire pool of questions and used in a separate process to divide the pool of test items first into families and then re-run to generate specific forms. The method of FIG. 7, however, is efficiently accomplished in a single pass through the form generation process.

Either technique avoids an inevitable form of item harvesting when repeat items are administered to the same person, given the assumption that a test taker will remember at least a few test items and can later study in the hope of seeing that one or more of those test items again. Either technique also avoids a more complicated process of repeat test selection using an item-by-item screening to compare every item presented in a previous test with every item in a proposed subsequent test to determine that no overlapping items exist, if two such tests exist. Such a process is even more unwieldy if a third re-test is involved. By simply selecting a test form from another family, the test administrator is guaranteed that no repeat test items will appear on a subsequent test. In qualification testing, where ultimately one more correct answer can be the difference between passing and failing, the impact is significant.

Figure 8:
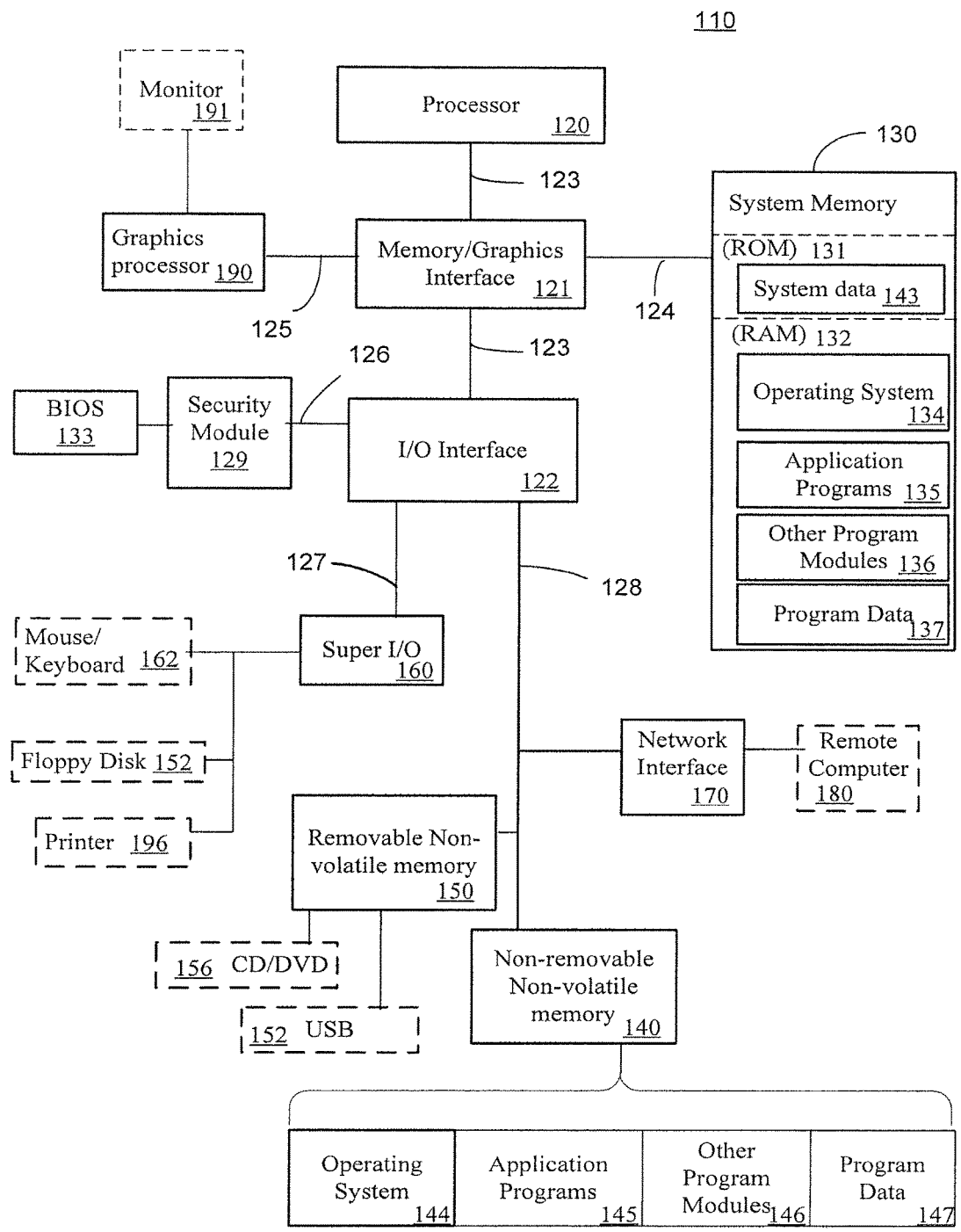
FIG. 8 is a block diagram showing an exemplary electronic device in the form of a computer supporting a pallet assembly process.

With reference to FIG. 8, an exemplary system for implementing the claimed method and apparatus includes a general purpose computing device in the form of a computer 110. Components shown in dashed outline are not technically part of the computer 110, but are used to illustrate the exemplary embodiment of FIG. 8. Components of computer 110 may include, but are not limited to, a processor 120, a system memory 130, a memory/graphics interface 121 and an I/O interface 122. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer executable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, data stores, or other physical storage elements that physically embody electronic data and excludes any propagated media such as radio waves or modulated carrier signals.

The system memory 130 includes computer storage media in the form of volatile and/or nonvolatile memory such as read only memory (ROM) 131 and random access memory (RAM) 132. The system ROM 131 may contain permanent system data 143, such as computer-specific data that may be used as a seed for generating random numbers or nonces, for example, for use in item selection and statistical calculations. RAM 132 typically contains data and/or program modules that are immediately accessible to and/or presently being operated on by processor 120. By way of example, and not limitation, FIG. 8 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace. In one embodiment, bus 128 may be a Peripheral Component Interconnect (PCI) bus.

The computer 110 may also include other removable/non-removable, volatile/nonvolatile computer storage media. By way of example only, FIG. 8 illustrates a hard disk drive 140 that reads from or writes to non-removable, nonvolatile magnetic media. The hard disk drive 140 may be a conventional hard disk drive.

Removable media, such as a universal serial bus (USB) memory 153, firewire (IEEE 1394), or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 8, provide storage of computer readable instructions, data structures, program modules and other data for the computer 110. In FIG. 8, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical communication ports to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 8 may include a local area network (LAN), a wide area network (WAN), or both, but may also include other networks. Such networking environments are commonplace in offices, enterprise-wide computer networks, intranets, and the Internet.

In summary, the pallet assembly system and process enables delivery of a large number of parallel test forms with precise control over global item exposure and better utilization of existing items. The pallet thus generated has forms that are optimized for pass-fail decision making but that are very similar in terms of content and psychometric characteristics. The use of pre-assembled fixed forms eliminates unnecessary computational overhead associated with CAT and LOFT and allows subject matter expert and psychometric expert review of test forms before publication. The pallet assembly system centralizes control of all pre-publication processing but retains the ability for continued use of rigorously proctored testing centers and established test delivery architectures.

In further summary, various aspects of the disclosed embodiments include:

1. A first aspect includes a method (600) of assembling a set of test forms or a "pallet" where each form in the pallet complies with given psychometric and content constraints, the method comprising:

generating (602) a plurality of test items;

storing (604), by a computer (110), the plurality of test items in a database (208);

developing (606) metadata for each test item, the metadata describing psychometric and content characteristics of each test item and test item interaction data;

storing (608), by the computer, the metadata in the database;

developing (610) a psychometric and content requirement for a particular pallet;

creating (612), using a computer, a computer model of the psychometric and content requirement;

specifying (614) a number of forms for the pallet;

specifying (614) test generation parameters;

setting (616), on the computer, the test generation parameters to initial values; executing a test generation cycle comprising:

a) using an optimization engine (210), creating (618) a test form assembled from the plurality of test items that meets the psychometric and content requirement, wherein the optimization engine uses the computer model and test generation parameters to select test items;

b) adjusting (622), using the optimization engine, the test generation parameters based on the items selected for the test form; and repeating the test generation cycle to create additional unique test forms until one of the number of test forms specified for the pallet is met or no more forms can be constructed that meet the psychometric and content requirement.

2. The aspect of aspect 1, wherein developing (610) the psychometric requirement comprises setting a psychometric requirement maximizing item diversity across the pallet, without an explicit maximum item exposure limit, while simultaneously setting a test information floor at the user-defined test cut point.

3. The aspect of aspects 1-2, wherein developing (610) the psychometric requirement comprises setting a psychometric requirement maximizing item diversity across the pallet, with an explicit maximum item exposure limit and simultaneously setting a test information floor at the user-defined test cut point.

4. The aspect of aspects 1-3, wherein developing (610) the psychometric requirement comprises setting a psychometric requirement maximizing item diversity of unscored pretest items without a test information floor at the test cut point, while simultaneously executing the aspect of aspect 1 over the set of operational items, 5. The aspect of aspects 1-4, further comprising:

delivering the pallet to a testing facility for electronic test administration;

storing the pallet on a computer at the testing facility; and administering individual tests from the pallet to testing subjects at the testing facility.

6. The aspect of aspects 1-5, wherein interaction data is one of test item set data describing a maximum and minimum number of cohort items from the set that must appear on the test form when any member of the set is selected, or enemy item data describing one or more items that must be excluded from a test form whenever one of the enemy cohort items is selected for inclusion on a test form.

7. The aspect of aspects 1-6, wherein interaction data may refer to a combination of operational and unscored pretest items.

8. The aspect of aspects 1-7, wherein adjusting (622) the test generation parameters comprises adjusting an item use parameter to control an exposure rate for the item.

9. The aspect of aspects 1-8, wherein adjusting an item use parameter comprises:

initially setting an item exposure count to a maximum value for the item; and reducing an item exposure count after each use of the item.

10. The aspect of aspects 1-9, further comprising:

identifying one or more test items as a preferred item; and separately adjusting preferred item exposure across the pallet.

11. The aspect of aspects 1-10, wherein separately adjusting preferred item exposure comprises:

reducing an eligibility weighting for a preferred item to lower the probability of selection of the preferred item for the next test form; and after each consecutive test where the preferred item is not selected, increasing the eligibility weighting for the preferred item to increase the probability of selection of the item during the next test generation cycle.

12. The aspect of aspects 1-11, wherein separately adjusting preferred item exposure comprises excluding the preferred item from selection for a form for a selected number of form generation cycles.

13. The aspect of aspects 1-12, further comprising:
removing one or more test items in a test; adjusting the item metadata or the composition of the item pool;
setting a test form assembly requirement to minimize changes in the pre-existing pallet; and
re-executing the test form assembly cycle for the pallet so that a replacement one or more test items are selected in accordance with the test form assembly requirement.

14. A system for generating a pallet of tests comprising:
a processor (120) configured to execute an optimization engine (210);
a database (202) coupled to the processor having a plurality of data items (204) and respective test item metadata (206) stored therein;
a computer storage media (130, 140) coupled to the processor (120) and having stored thereon:
first psychometric and content parameters that define requirements for each test in the pallet, wherein at least one test generation parameter sets a test information floor at a test cut point;
second psychometric and content parameters that define requirements for a composite of all tests in the pallet;
test generation parameters that correspond to item usage during preparation of individual test forms and the pallet;
a setting specifying a number of tests in the pallet;
a program characterizing constraints used by the optimization engine (210) to meet the first psychometric and content parameters and the second psychometric and content parameters, wherein the optimization engine adjusts the test generation parameters after each form is assembled and added to the pallet, the test generation parameters to account for item usage and to set reuse parameters for preferred test items.

15. The aspect of aspect 14, wherein the second psychometric parameters include a requirement maximizing item diversity across the pallet without specifying a limit on individual item exposure.

16. The aspect of aspects 14-15, wherein the program characterizing constraints used by the optimization engine (210) supports replacement of removed test items while maintaining the test information floor and maximizes item diversity across the pallet.

17. The aspect of aspects 14-16, wherein the test generation parameters include test item set data describing related items and a relative order for the related items.

18. The aspect of aspects 14-17, wherein the test generation parameters include item enemy lists of items which should not appear in the same form.

19. The aspect of aspects 14-18, wherein the test generation parameters identify preferred test items and adjust preferred item exposure across the pallet separately from the general population of test items.

20. An aspect of a computer storage media (130, 140) having computer executable instructions stored thereon that when executed on a computer implement a method of assembling a pallet of test forms, the method comprising:
generating a plurality of test items;
storing the plurality of test items in a database;
developing metadata for each test item, the metadata describing psychometric and content characteristics of each test item and test item interaction data;
storing the metadata in the database;
developing a psychometric and content requirement for a particular pallet, the psychometric requirement including a test information floor at a cut point of each test form in the pallet;
creating a computer model of the psychometric and content requirement;
specifying a number of tests for the pallet;
identifying test generation parameters;
setting the test generation parameters to initial values;
executing a test generation cycle comprising:
a) using an optimization engine (210), creating an assembled test form from the plurality of test items that meets the psychometric requirement, wherein the optimization engine uses the computer model and test generation parameters to select test items;
b) adjusting the test generation parameters based on the items selected for the test form; and
repeating the test generation cycle to create additional unique tests until the number of tests specified for the pallet is met.

21. The aspect of aspect 20, further comprising:
identifying one or more test items as a preferred item; and
separately adjusting preferred item exposure across the pallet.

22. The aspect of aspects 20-21, wherein separately adjusting preferred item exposure comprises reducing an eligibility weighting for a preferred item to lower the probability of selection of the preferred item for the next test and after each consecutive test where the preferred item is not selected, increasing the eligibility weighting for the preferred item to increase the probability of selection of the item.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:
1. A method of assembling a set of test forms or a "pallet" where each form in the pallet complies with given psychometric and content constraints, the method comprising:
storing, by a computer, a plurality of test items in a database, wherein each test item belongs to an item pool;
developing metadata for each test item, the metadata describing (i) psychometric and content characteristics of each test item and (ii) test item interaction data;
storing, by the computer, the metadata in the database;
specifying a number of test forms for the pallet; and
assembling the pallet, wherein assembling includes:
setting, on the computer, test generation parameters to initial values,
executing a test generation cycle comprising:
a) optimizing a linear objective function subject to maintaining a set information floor at a test cut point of the test form while maximizing test item use, wherein the linear objective function is a function of the psychometric and content constraints and the test generation parameters;
b) executing the linear objective function to select test items from the plurality of test items that meet the psychometric and content constraints;
c) creating a test form assembled from the selected test items that meets the psychometric and content constraints;
d) adjusting the test generation parameters for each test item in the pool of test items after each test form is assembled and added to the pallet, the test generation parameters to (i) account for test items selected for the test form and (ii) to set reuse parameters for preferred test items, and
repeating the test generation cycle to create additional unique test forms until (i) the number of test forms specified for the pallet is met or (ii) no more test forms can be constructed that meet the psychometric and the content requirement.

2. The method of claim 1, wherein developing the psychometric requirement comprises setting the psychometric requirement maximizing item diversity across the pallet absent an explicit maximum item exposure limit, while simultaneously setting a test information floor at a user-defined test cut point.

3. The method of claim 1, wherein developing the psychometric requirement comprises setting the psychometric requirement maximizing item diversity across the pallet with an explicit maximum item exposure limit, while simultaneously setting a test information floor at a user-defined test cut point.

4. The method of claim 1, wherein developing the psychometric requirement comprises setting the psychometric requirement maximizing item diversity of unscored pretest items without a test information floor at a test cut point while maintaining a test information floor at the test cut point for a set of operational items.

5. The method of claim 1, further comprising:
delivering the pallet to a testing facility for electronic test administration.

6. The method of claim 1, wherein test item interaction data is test item set data describing one of (i) a maximum or a minimum number of cohort items from the test item set that must appear on a test form when any member of the set is selected, or (ii) enemy item data describing one or more items that must be excluded from a test form whenever one of the enemy cohort items is selected for inclusion on a test form.

7. The method of claim 6, wherein test item interaction data refer to a combination of operational and unscored pretest items.

8. The method of claim 1, wherein adjusting the test generation parameters comprises adjusting the item use parameter to control an exposure rate for the test item.

9. The method of claim 8, wherein adjusting the item use parameter comprises:
initially setting an item exposure count to a maximum value for the test item; and
reducing the item exposure count after each use of the test item.

10. The method of claim 1, further comprising:
identifying one or more test items as a preferred item; and
separately adjusting an exposure rate for the one or more preferred items across the pallet.

11. The method of claim 10, wherein separately adjusting the exposure rate for the one or more preferred items comprises:
reducing an eligibility weighting for each preferred item to lower a probability of selection of the preferred item for a next test form; and
after each consecutive test where the preferred item is not selected, increasing the eligibility weighting for the preferred item to increase the probability of selection of the preferred item during a next test generation cycle.

12. The method of claim 10, wherein separately adjusting the exposure rate for the one or more preferred items comprises excluding the one or more preferred items from selection for a form for a selected number of test generation cycles.

13. The method of claim 1, further comprising:
removing one or more test items from a test form;
adjusting the item metadata of the one or more test items;
setting a test form assembly requirement to minimize a number of changes in the pallet; and
re-executing the test form assembly cycle for the pallet so that a replacement one or more test items are selected in accordance with the test form assembly requirement.

14. A system for generating a pallet of tests comprising:
a processor configured to execute a linear objective function;
a database coupled to the processor having a plurality of test items and respective test item metadata stored therein, wherein each test item belongs to a pool of test items;
a computer storage media coupled to the processor and having stored thereon:
test generation parameters that correspond to item usage during preparation of individual test forms and the pallet;
first psychometric and content parameters that define requirements for each test in the pallet, wherein at least one of the test generation parameter sets a test information floor at a test cut point;
second psychometric and content parameters that define requirements for a composite of all tests in the pallet;
a setting specifying a number of tests in the pallet;
a program executing a test generation cycle comprising:
characterizing constraints used by the linear objective function to meet the first psychometric and content parameters and the second psychometric and content parameters, wherein the linear objective function adjusts the test generation parameters for each test item in the pool of test items, after each form is assembled and added to the pallet, to (i) account for test items selected for the test form and (ii) to set reuse parameters for preferred test items; and
repeating the test generation cycle to create additional unique test forms until the number of test forms specified for the pallet is met.

15. The system of claim 14, wherein the second psychometric parameters include a requirement maximizing item diversity across the pallet without specifying a limit on exposure for an individual test item.

16. The system of claim 15, wherein the program characterizing constraints used by the optimization engine support a replacement of removed test items while (i) maintaining the test information floor and (ii) maximizing test item diversity across the pallet.

17. The system of claim 14, wherein the test generation parameters include test item set data describing related items and a relative order for the related items.

18. The system of claim 14, wherein the test generation parameters include lists of enemy items which should not appear in the same form as a respective test item.

19. The system of claim 14, wherein the test generation parameters identify the preferred test items and adjust item exposure for the preferred test items across the pallet separately from a general population of test items.

20. A non-transitory computer storage medium having computer executable instructions stored thereon for assembling a pallet of test forms, that when executed on a computer, cause the computer to:
    store a plurality of test items in a database, wherein each test item belongs to an item pool;
    develop metadata for each test item, the metadata describing (i) psychometric and content characteristics and (ii) test item interaction data for each test item;
    store the metadata in the database;
    specify a number of test forms for the pallet; and
    assemble the pallet, wherein assembling includes:
        setting test generation parameters to initial values,
        executing a test generation cycle comprising:
            a) optimizing a linear objective function subject to maintaining a set information floor at a test cut point of the test form while maximizing test item use, wherein the linear objective function is a function of psychometric and content constraints and the test generation parameters;
            b) executing the linear objective function to select test items from the plurality of test items that meet the psychometric and content constraints;
            c) creating a test form assembled from the selected test items, wherein the test form meets the psychometric and content constraints;
            d) adjusting the test generation parameters for each test item in the pool of test items after each test form is assembled and added to the pallet, the test generation parameters to (i) account for test items selected for the test form and (ii) to set reuse parameters for preferred test items, and
        repeating the test generation cycle to create additional unique test forms until the number of test forms specified for the pallet is met.

21. The computer-readable memory of claim 20, wherein the computer executable instructions further cause the computer to:
    identify one or more test items as a preferred test item; and
    separately adjust exposure of the one or more preferred test items across the pallet.

22. The computer-readable memory of claim 21, wherein separately adjusting exposure of a preferred test item comprises:
    reducing an eligibility weighting for the preferred test item to lower a probability of selection of the preferred test item for the next assembled test; and
    after each test consecutive test where the preferred test item is not selected, increasing the eligibility weighting for the preferred test item to increase the probability of selection of the preferred test item.

* * * * *